(12) United States Patent
Van Den Ende et al.

(10) Patent No.: US 7,249,885 B2
(45) Date of Patent: Jul. 31, 2007

(54) HEAT FLUX MEASURING DEVICE FOR PRESSURE PIPES, METHOD FOR PRODUCING A MEASURING DEVICE, METHOD FOR MONITORING AN OPERATING STATE OF A HEAT EXCHANGER, HEAT EXCHANGER AND METHOD FOR MEASURING A HEAT FLUX

(75) Inventors: Johannes Van Den Ende, Delfgauw (NL); Cornelis Jan Van Den Bos, Delft (NL); Manfred Frach, Wesel (DE); Stephan Simon, Hamminkeln (DE)

(73) Assignee: Clyde Bergemann GmbH, Wesel (DE)

( * ) Notice: Subject to any disclaimer, the term of this patent is extended or adjusted under 35 U.S.C. 154(b) by 0 days.

(21) Appl. No.: 11/108,438

(22) Filed: Apr. 18, 2005

(65) Prior Publication Data

US 2005/0217841 A1 Oct. 6, 2005

Related U.S. Application Data

(63) Continuation of application No. PCT/EP03/11415, filed on Oct. 15, 2003.

(30) Foreign Application Priority Data

Oct. 16, 2002 (DE) ................. 102 48 312

(51) Int. Cl.
  *G01K 1/14* (2006.01)
  *G01K 1/16* (2006.01)
  *G01K 1/26* (2006.01)
  *G01K 13/02* (2006.01)
  *G01K 7/02* (2006.01)
  *G01K 17/00* (2006.01)
(52) U.S. Cl. .................. 374/147; 374/29; 374/179

(58) Field of Classification Search ................ 374/147, 374/208, 179, 29
See application file for complete search history.

(56) References Cited

U.S. PATENT DOCUMENTS 3,204,458 A * 9/1965 Gillen ...................... 73/861.26
4,023,411 A * 5/1977 Escher ........................ 136/233

(Continued)

FOREIGN PATENT DOCUMENTS

| CA | 2 360 217 A1 | 4/2002 |
| GB | 2 262 608 A | 6/1993 |
| GB | 2 271 440 A | 4/1994 |

OTHER PUBLICATIONS

S.B.H.C. Neal et al.: "The Measurement Of Radiant Heat Flux In Large Boiler Furnaces—II. Development of Flux Measuring Instruments", *Int. J. Heat Mass Transfer*, vol. 23, 1980, pp. 1023-1031.

*Primary Examiner*—Gail Verbitsky
(74) *Attorney, Agent, or Firm*—Laurence A. Greenberg; Werner H. Stemer; Ralph E. Locher

(57) ABSTRACT

A measuring device for a heat exchanger includes a heat exchanger pressure pipe having a pipe wall with a circumference, and an indentation extending over and deforming a portion of the circumference. At least one thermocouple is disposed eccentrically in the portion of the circumference deformed by the indentation. Filling material fills the indentation. A method for producing a measuring device in a pressure pipe of a heat exchanger, a method for monitoring an operating state of a heat exchanger having a pressure pipe, a heat exchanger, and a method for measuring a heat flux, are also provided. The size of the indentation can be decreased for a given size of the thermocouple due to the eccentric configuration of the thermocouple, so that the heat flux is obstructed to a comparatively small degree by the pipe wall while local overheating of the pipe wall is prevented.

17 Claims, 2 Drawing Sheets

U.S. PATENT DOCUMENTS

| | | | |
|---|---|---|---|
| 4,203,186 A * | 5/1980 | Horner | 29/890.045 |
| 4,346,864 A * | 8/1982 | Feller | 236/1 R |
| 4,488,516 A | 12/1984 | Bueters et al. | |
| 4,527,908 A * | 7/1985 | Arisi | 374/147 |
| 4,595,287 A * | 6/1986 | Edlin | 356/28.5 |
| 4,595,297 A * | 6/1986 | Liu et al. | 374/29 |
| 4,603,660 A | 8/1986 | Wynnyckyj et al. | |
| 4,628,870 A | 12/1986 | Draper et al. | |
| 4,671,675 A * | 6/1987 | Arisi et al. | 374/147 |
| 4,722,610 A * | 2/1988 | Levert et al. | 374/43 |
| 4,856,911 A * | 8/1989 | Roth et al. | 374/135 |
| 4,868,151 A * | 9/1989 | Satake et al. | 503/209 |
| 5,050,108 A | 9/1991 | Clark et al. | |
| 5,052,190 A * | 10/1991 | Gregory | 62/225 |
| 5,064,604 A * | 11/1991 | Barton | 376/246 |
| 5,141,335 A * | 8/1992 | Wannamaker et al. | 374/179 |
| 5,157,619 A * | 10/1992 | Palusamy et al. | 702/43 |
| 5,172,979 A * | 12/1992 | Barkley et al. | 374/147 |
| 5,382,093 A * | 1/1995 | Dutcher | 374/208 |
| 5,450,765 A * | 9/1995 | Stover | 73/866.5 |
| 5,691,466 A * | 11/1997 | Lawrence et al. | 73/29.05 |
| 5,711,607 A * | 1/1998 | Bernstein | 374/179 |
| 5,711,608 A * | 1/1998 | Finney | 374/208 |
| 6,112,580 A * | 9/2000 | Hesky | 73/49.1 |
| 6,217,211 B1 * | 4/2001 | Hesky | 374/4 |
| 6,248,077 B1 * | 6/2001 | Elson et al. | 600/505 |
| 6,485,174 B1 * | 11/2002 | Albrecht et al. | 374/29 |
| 6,579,006 B1 * | 6/2003 | Pariseau | 374/162 |
| 6,848,373 B2 * | 2/2005 | Breen et al. | 110/341 |
| 6,942,384 B2 * | 9/2005 | Schmidt | 374/208 |
| 2003/0055586 A1 | 3/2003 | Mills, Jr. | |
| 2003/0079867 A1 * | 5/2003 | Chang et al. | 165/133 |
| 2004/0151230 A1 * | 8/2004 | Das et al. | 374/141 |

\* cited by examiner

HEAT FLUX MEASURING DEVICE FOR PRESSURE PIPES, METHOD FOR PRODUCING A MEASURING DEVICE, METHOD FOR MONITORING AN OPERATING STATE OF A HEAT EXCHANGER, HEAT EXCHANGER AND METHOD FOR MEASURING A HEAT FLUX

CROSS-REFERENCE TO RELATED APPLICATION

This application is a continuing application, under 35 U.S.C. § 120, of copending International Application No. PCT/EP2003/011415, filed Oct. 15, 2003, which designated the United States; this application also claims the priority, under 35 U.S.C. § 119, of German Patent Application 102 48 312.4, filed Oct. 16, 2002; the prior applications are herewith incorporated by reference in their entirety.

BACKGROUND OF THE INVENTION

Field of the Invention

The present invention relates to a measuring device for pressure pipes of a heat exchanger or heating boiler including a pressure pipe and at least one thermocouple. The invention also relates to a method for producing a measuring device for pressure pipes, a method for monitoring an operating state of a heat exchanger having a pressure pipe, a heat exchanger, and a method for measuring a heat flux.

When obtaining electrical energy by burning fossil fuels, for example, the thermal energy that is produced when the fuel is burnt is conventionally used to heat water flowing in pressure pipes. The heated water is used, for example, to produce steam and to drive a steam turbine.

The efficiency of heating boilers of that type or of heat exchangers is determined, in particular, by the contamination of the outside and the inside of the pressure pipes. For example, combustion residues on the outside of the pipes cause the heating resistance of the pipes to increase and prevent a heat flux from the combustion chamber to the water. Increased heat resistance means that only a small portion of the heat from the water to be transferred may be received and converted into electrical energy.

As described in UK Patent Application GB 2 271 440 A, a determination may be made as to when cleaning of the pressure pipes is necessary by measuring the heat flux through the pipe wall. The conditions under which heat flux measurements on lines conveying high-pressure steam have to be carried out are especially problematic, in particular with regard to the high temperatures that are encountered. The high pressure also stresses the pressure pipes from the inside.

The heat flux (expressed in $W/m^2$) is measured through the heat exchanger surface through the use of a heat flux sensor. That information can be used to study the behavior of the heating boiler or heat exchanger, to control a combustion chamber, to guide a water lance blower and to detect the contamination of heat exchanger surfaces.

The general requirements for a heat flux sensor on pressure pipes are the stability, the strength and the reliability of the sensors under the respective conditions. Moreover, the sensors should influence the heat flux as little as possible, i.e. operation, size and dimensions thereof should influence the measured variable as little as possible. The sensors should also cause the pressure pipe surface to overheat as little as possible. They should impede the flow of the pressure medium as little as possible. For the sake of reliability, it is expedient to configure the sensors in such a way that they may be redundantly disposed.

Known heat flux sensors for pressure pipes of a heating boiler are described in an article by Neal S. H. B. C., Northover E. W. et al., in Journal of Heat and Mass Transfer, Vol. 23, pp. 1023 to 1031, Pergament Press, 1980. In that case, two sensors are either applied to the surface of a pressure pipe or alternatively inserted into a thickened line. In the second variation, a sensor is embedded in a local concave portion of the pressure pipe. It is known that the second embodiment satisfies all of the requirements except for the fact that, as a result of the local concave portion, a flow resistance, which impedes the operation of the pressure pipes, is built up inside the pressure pipe.

Thickened pressure pipe sensors are usually produced from a conventional pressure pipe in such a way that the pipe is provided with an indentation, in order to provide space for a sensor. The local indentation is filled with filling material, typically with welding material. The filling material is mechanically treated in such a way that a sensor may be embedded.

A first, important aspect is that the pressure pipe wall temperature (and therefore the temperature of the sensor) is lower than the maximum permitted temperature for the pressure pipe and the sensor. This critical value is material-specific and may, for example, be about 600° C. Operating the system above 600° then rapidly impairs the efficiency of the pressure pipe and the sensor, so that the operation of the heating boiler is threatened by a malfunction of the pressure pipes. The pressure pipes exhibit, for example, wall thicknesses of between 4 mm and 10 mm and may advantageously be made of various molybdenum steel alloys. For example, at a steam temperature of 420° C. and a heat flux of approximately 250 $kW/m^2$ and a 6 mm wall thickness, the outer wall temperature is about 450° C. If a heat flux sensor, which conventionally has an overall height of between 5 and 8 mm, is incorporated onto or into a pressure pipe of that type, the outside temperature of the pressure pipes, with the same heat flux and same steam temperature, remains, for example, at approximately 530° C., if typical material values are assumed. In the event of higher heat fluxes, higher steam temperatures or a cooling failure, the surface of the pressure pipe at the sensor easily reaches the critical temperature of 600° C. That shows that the thermal resistance of the heat flux sensor may not be ignored and therefore has to be reduced.

In addition to the problem of overheating of the outer walls, the flow profile of the pressure medium inside the pressure pipes poses a further problem. A non-laminar flow of the pressure medium, for example a local vortex, may lead locally to a reduction of the heat transfer, and that may in turn cause local overheating. It is therefore conventional, as is known from UK Patent Application GB 2 271 440 A, to keep the angle of inclination of the indentation as small as possible in the flow direction of the pressure medium, in order to prevent a release of flow. A further problem in conjunction with indentations is that, in particular at high pressures of the pressure medium, indentations of that type may lead to mechanical instabilities in the pressure pipes.

The definitive factor for reducing the size of the indentation is, on one hand, the sensitivity of the sensor and, on the other hand, the possibility of guiding the electrical lines of the sensor, from the sensor out of the combustion chamber.

A further aim is to determine, in as comprehensive and precise a manner as possible, the parameters that are relevant to the operation of a heating boiler.

SUMMARY OF THE INVENTION

It is accordingly an object of the invention to provide a heat flux measuring device for pressure pipes, a method for producing a measuring device, a method for monitoring an operating state of a heat exchanger, a heat exchanger, and a method for measuring a heat flux, which overcome the hereinafore-mentioned disadvantages of the heretofore-known devices and methods of this general type and which permit reliable measurement of the heat flux.

With the foregoing and other objects in view there is provided, in accordance with the invention, a measuring device for a heat exchanger. The measuring device comprises a heat exchanger pressure pipe having a pipe wall with a circumference, and an indentation extending over and deforming a portion of the circumference. At least one thermocouple is disposed eccentrically in the portion of the circumference deformed by the indentation. Filling material fills the indentation.

The pressure pipe is made of a mechanically highly stable and thermally stable material, in particular steel such as, for example, 15 Mo3. The pressure pipes are guided through the combustion chamber of the heating boiler, so that a heat exchange takes place between the inner chamber of the heating boiler and the pressure medium conveyed in the pressure pipes. The pressure medium may, for example, be water, which is converted into water vapor through the use of the heat absorption. The heat exchanger may be used for exchanging heat between two fluids, in particular between two gases. It may, in particular, also be a heating boiler for combustion, wherein the heat that is produced during combustion is dissipated by a cooling medium. The heat exchanger may also be used in a waste incineration plant.

As a result of the eccentric configuration of the thermocouple in the portion that is deformed by the indentation, the indentation is used both for receiving the thermocouple and for guiding electrical lines of the thermocouple. This is particularly important if the electrical lines have to be protected from mechanical, thermal or chemical influences of the environment in a heating boiler such as, for example, combustion gases, which may occur as a result of both the thermocouple and the electrical lines being embedded into the filling material. The filling material thus protects both the thermocouple and the electrical lines. The filling material may, for example, be welding material.

As a result of the eccentric configuration, the electrical lines of the thermocouple may be guided and protected over particularly long distances in the filling material.

With the spatial requirements determined by the thermocouple and by the electrical lines, the eccentric configuration also allows the indentation to be used particularly efficiently. As a result thereof the indentation relative to the cross-section of the pressure pipe may be selected so as to be small in comparison with conventional constructions. Against the background of the flow behavior of the pressure medium in the pressure pipe, particularly small indentations are desirable in order to reduce the flow resistance in the pressure pipe.

The eccentric configuration, and the reduced size of the indentation facilitated thereby, allows improved heat flux through the pipe wall. The size of the portion to be filled with filling material is reduced, as a result of which the heat resistance remains low as compared to conventional constructions. The reduced size of the indentation also generally reduces the curvature of the pipe wall, allowing greater strength of the pressure pipe to be attained, as is especially important, in particular, for high-pressure applications.

As a result of the eccentric configuration, an increase in temperature in the region of the thermocouple is minimized. This improves the measurement accuracy of the thermocouple, on one hand, and the mechanical strength of the pressure pipe, on the other hand. The reduced size of the indentation prevents drops in pressure in the pressure medium along the pressure pipe, thus preventing local vortexes and partition regions. This ensures that no local overheating, resulting from the flow behavior of the pressure medium, occurs. The reduction in the internal cross-section of the pressure pipe in the eccentric configuration is less than 30%, advantageously less than 27%, particularly preferably less than 25%, corresponding to an improvement of about 20% over conventional constructions, which exhibit a reduction in internal cross-section of at least 38%. Pressure losses are also reduced by 20% as a result of the reduction in size of the indentation. However, the decrease in filling material also means that the production time of a measuring device of this type is shortened, since the production time is determined by the step of filling the indentation with filling material. The invention allows the amount of filling material required to be reduced by more than 20%, in particular more than 30%.

In accordance with another feature of the invention, two thermocouples for measuring a heat flux are disposed eccentrically in a physically spaced or spatially separated manner in the indentation. Two temperatures, with which the gradient of the temperature profile may be determined in the first place, may be measured at various space points or locations using two thermocouples. Advantageously, the two thermocouples are disposed above each other in the indentation, so that the temperature gradient is detected through the pipe wall. In order to detect a temperature gradient along the pipe wall, it is expedient to space apart two thermocouples spatially, one behind the other, in the longitudinal direction of the pressure pipe. In order to detect the temperature profile in detail, it is expedient to use more than two thermocouples. Heat fluxes may be temporally detected with respect to their amount and/or their direction through the temperature profile and after calibration with respect to the coefficients of thermal conduction. This also allows temperatures to be measured at various points or locations.

In accordance with a further feature of the invention, the pressure pipe includes a circumferential portion, which may be acted upon by a stream of heating fluid and the center of which is disposed with physical spacing or spatial separation from a center of the indentation. A stream of heating fluid is, for example, a stream of hot gas that is produced in the heating boiler during combustion such as, for example, a flame front. The circumferential portion faces and is acted upon by the stream of heating fluid. The center of the circumferential portion is usually exposed to a particular temperature stress. The indentation, which extends over a portion of the circumference of the pipe wall, includes the center that is located laterally to the center of the circumferential portion. This allows the electrical lines of a thermocouple, which is advantageously disposed in the proximity of the center, to be guided in the filling material of the indentation, so the electrical lines are mechanically, thermally and chemically protected over a particularly long distance.

In accordance with an added feature of the invention, in order to measure a heat flux through the pipe wall, the thermocouples are disposed substantially above one another in the indentation in the pressure pipe. The pressure pipes may extend freely in the inner space of a heat exchanger, though they may also be connected to one another in a gas-tight manner at their lateral wall portions, thus forming an inner space of the heat exchanger, in which the stream of heating fluid may be enclosed and conveyed. The side wall portions may also be used to increase the size of the effectively active surface of the pressure pipes, so that improved heat transfer from the stream of heating fluid to the pressure medium takes place. The heat that is received by the side wall portions is passed onto and received from the pipe wall of the pressure pipe.

In accordance with an additional feature of the invention, the thermocouples are surrounded by at least one heat conduction barrier. The heat conduction barrier provides thermal insulation, for preventing undesirable heat fluxes, which might, in particular, impair measurement. For example, for measuring the heat flux through the pipe wall, it is expedient to place an annular groove around the thermocouples, so that a drop in temperature along the pipe does not have any influence on the heat flux measurement through the pipe wall.

As a result of the selection of different materials for the pressure pipe and the filling material, as well as for the thermocouples, local heat flux gradients, which limit the accuracy of measurement, may occur locally. An annular groove inhibits the heat flux gradients that do not extend parallel to the axis of the ring.

In accordance with yet another feature of the invention, a protective pipe for electrical lines of the thermocouple is attached to the pressure pipe on a side of the pressure pipe substantially opposite to the thermocouple. The protective pipe protects the electrical lines of the thermocouple from mechanical, thermal or chemical influences. As a result of the configuration of the protective pipe on a side of the pressure pipe opposite to the thermocouple, the heat conduction of the protective pipe does not influence the measurement of the heat flux through the pipe wall. The electrical lines of the thermocouple are advantageously laid in the indentation.

In accordance with yet a further feature of the invention, the filling material fills the indentation without protruding. This ensures that there is only a small contact surface for applied impurities, thus preventing a non-representative contamination of the outer wall of the pressure pipes. Moreover, a protrusion-free filling of the indentation also means that the hydrodynamic properties, in particular the flow resistance of the pressure pipe, are advantageous for the stream of heating fluid.

With the objects of the invention in view, there is also provided a measuring device for a heat exchanger, comprising a pressure pipe and at least one thermocouple. The pressure pipe has a pipe wall, in which there is an indentation, that extends over a portion of the circumference of the pipe wall. The indentation receives the thermocouple and is filled with filling material. An electrical terminal is attached to the pressure pipe or to a connecting wall. Advantageously, the electrical terminal is attached in the indentation.

In accordance with yet an added feature of the invention, a device for measuring a heat flux is also used to measure an electrical resistance along or transversely to components of the heat exchanger. For this purpose, an electrical terminal is integrated into the device for measuring a heat flux. The device for measuring a heat flux is connected to an electrical terminal in a compact, modular manner. The device for measuring the heat flux may be the measuring device according to the invention, but may also be a device known in the prior art.

The degree of corrosion of the heat exchanger and, in particular, the extent of the corrosion of the pressure pipes or connecting walls that are exposed to the aggressive gases or liquids, may be inferred with the aid of the electrical resistance and the time variation thereof. The reduction in the wall thicknesses of the pressure pipes or connecting walls caused by corrosion results in an increase in electrical resistance along or transversely to the pressure pipes or connecting walls.

The precise determination of the degree of corrosion is used for monitoring the heat exchanger during its operation. Material characteristic values such as the loss of material per period of operation (in units of nanometers per hour) or the wall thickness of the pressure pipes or connecting walls, are calculated. There are a plurality of methods for measuring erosion and corrosion. UK Patent Application GB 2 262 608 A describes a local corrosion measurement sensor that contains a compensation device in order to reduce the influence of temperature fluctuations on the corrosion measurement. It is also known to undertake a four-point measurement along pressure pipes in order to determine the degree of corrosion not only locally, but also integrally over comparatively large distances. Since the resistance is highly temperature-dependent, additional temperature sensors, distributed over the heat exchanger, are required. The temperature-specific contribution is extracted from the integrally measured electrical resistance using additional temperature measurements, and the corrosion-specific content is determined. U.S. Patent Application Publication No. US 2003/055586A1 discloses a mathematical method, with which measurement errors in the electrical resistance measurement are minimized in a control model for electrical resistance mapping. Corrosion measurement devices of that type are, however, complex, since not only electrical contacts, but also additional temperatures sensors have to be attached to the pressure pipes.

In accordance with yet an additional feature of the invention, the heat flux sensors in the heat exchanger are used in a dual manner, namely for determining its degree of contamination and further material characteristic values such as, for example, its degree of corrosion. A particularly compact construction of the sensors is thereby attained, and an installation or retrofitting of an existing system is simplified. The number of additional temperature sensors that is required is reduced. The wiring of the sensors is also simplified. Moreover, it also allows information regarding the heat flux to be taken into account when determining the material characteristic values such as, for example, the degree of corrosion, as a result of which a higher degree of precision is attained when determining these characteristic values. The heat flux sensors allow the temperature profile in the heat exchanger to be determined with a great deal more accuracy, since the heat flux data may be taken into account as peripheral conditions in the thermal mapping. This allows the degree of corrosion to be determined from the temperature-dependent electrical resistance in a substantially more precise manner. It is also advantageous that the simultaneous measurement of both the electrical resistance and the heat flux causes metrological redundancy, so that if one sensor is omitted, the other sensors are able to adopt its function. In general, the invention has the advantage that the service life of the heat exchanger, in particular its pressure pipes, or the maintenance rates, may be predicted much more accurately.

In accordance with again another feature of the invention, temperature fluctuations are used to identify the temperature-specific content of the electrical resistance. The integral electrical resistance, which is measured with time resolution, is accordingly correlated with the temperature fluctuation, which is measured with time resolution, and the temperature-specific content is extracted from the integrally measured electrical resistance.

In accordance with again a further feature of the invention, the measuring device includes an electrical terminal on the pressure pipe and/or the connecting walls.

With the objects of the invention in view, there is also provided a method for producing a measuring device in a pressure pipe of a heat exchanger. The method comprises providing an indentation extending over and deforming a portion of a circumference of a pipe wall of the pressure pipe. At least one thermocouple is placed eccentrically in the portion deformed by the indentation. The indentation is substantially filled with filling material.

As a result of the eccentric configuration of the thermocouple in the indentation, the size of the indentation is reduced, as a result of which the amount of filling material required for filling the indentation is reduced. The reduction in the amount of filling material to be filled leads to a shortening of the production time.

In accordance with another mode of the invention, at least two thermocouples are disposed eccentrically in a physically spaced or spatially separated manner in the indentation. It is advantageous to fill the indentation with filling material without protrusion.

In accordance with a further mode of the invention, the pressure pipe or a connecting wall is provided with an electrical terminal. This allows a dual use of the measuring device in a simple manner, namely for measuring a heat flux and for measuring an electrical resistance, as a result of which information regarding both the degree of contamination and material characteristic values, such as, for example, the state of corrosion or erosion of the heat exchanger including a modular unit, is obtained in a precise manner.

With the objects of the invention in view, there is additionally provided a method for monitoring an operating state of a heat exchanger having a pressure pipe. The method comprises measuring an electrical resistance between a first location and a second location of the heat exchanger. A heat flux is detected at least at one of the first and second locations.

In accordance with another mode of the invention, the locations are disposed at a distance along and/or transversely to the pressure pipes. The simultaneous use of one location both for measuring the heat flux and for measuring the degree of corrosion reduces costs in the installation and maintenance of the monitoring system. The temperatures and temperature gradients measured locally by the measuring device at one location are advantageously used to interpolate the temperature profile or temperature gradient profile between the measurement locations, and thus to estimate the temperature-dependent content of the electrical resistance, as a result of which the degree of corrosion may be determined with substantially higher accuracy.

With the objects of the invention in view, there is furthermore provided a heat exchanger, comprising a measuring device according to the invention.

In operation, the heat exchanger is impeded to a comparatively small degree by the measuring device for measuring the heat flux through the pipe wall, and local overheating of the pipe wall is avoided. Moreover, information regarding the degree of corrosion or erosion may optionally also be obtained economically in this manner.

With the objects of the invention in view, there is concomitantly provided a method for measuring a heat flux. The method comprises using a measuring device, for example of the invention, for establishing an electrical resistance for determining a degree of corrosion of the heat exchanger.

The measuring device is thus used in a dual manner as described. This advantageous dual use is possible not only in conjunction with the measuring device according to the invention, but also in conjunction with measuring devices as known from the prior art.

Other features which are considered as characteristic for the invention are set forth in the appended claims.

Although the invention is illustrated and described herein as embodied in a heat flux measuring device for pressure pipes, a method for producing a measuring device, a method for monitoring an operating state of a heat exchanger, a heat exchanger and a method for measuring a heat flux, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
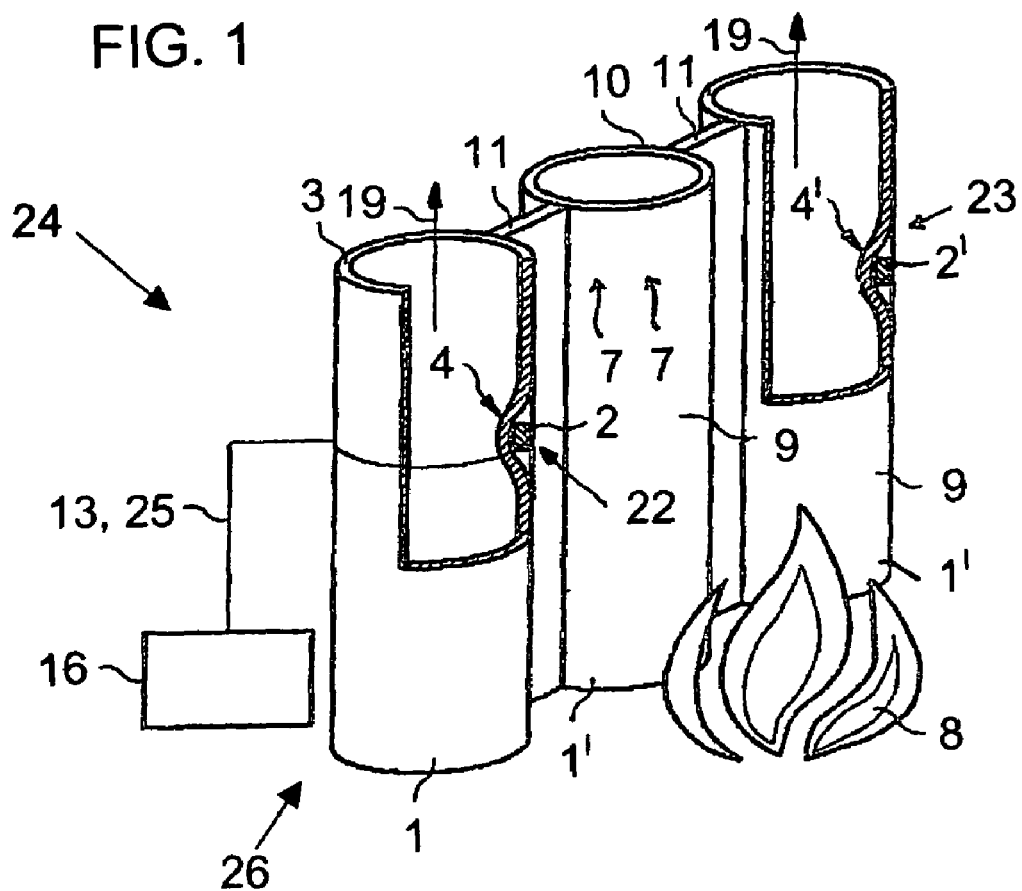
FIG. 1 is a partly broken-away perspective view of a measuring device according to the invention attached to pressure pipes of a heating boiler.

Referring now to the figures of the drawings in detail and first, particularly, to FIG. 1 thereof, there is seen a perspective view of a measuring device 26 according to the invention in a heat exchanger 24 including three pressure pipes 1, 1', 1" (collectively referred to by reference numeral 1) which are respectively connected to one another at their side wall portions 10 by a connecting wall 11. The pressure pipes 1 have a circumferential portion 7, which is acted upon by a stream of heating fluid 8 and which has a center 9. According to the invention, the pressure pipes have an indentation 4 at a first location 22 and an indentation 4' at a second location 23, in which one or more thermocouples or thermoelements 2, 2' and an electrical terminal 21, 21', (shown in FIG. 2) are inserted. An electrical terminal 27 (shown in FIG. 2) may also be placed at the connecting wall 11, as an alternative or in addition to the electrical terminal 21, 21'. The center 9 of the portion 7 is spatially separated from a center 5 of the indentation 4. The one or more thermocouples 2, 2' and the electrical terminal 21, 21' are connected to a control device 16 through respective electrical lines 13 and connecting lines 25. The control device 13 evaluates measurement data of the thermocouples 2, 2' and determines electrical resistance measured between the two locations 22, 23 transversely to the pressure pipes 1, 1', displays corresponding operating states, in particular a degree of contamination and a degree of corrosion, and instigates appropriate maintenance or cleaning procedures.

Figure 2:
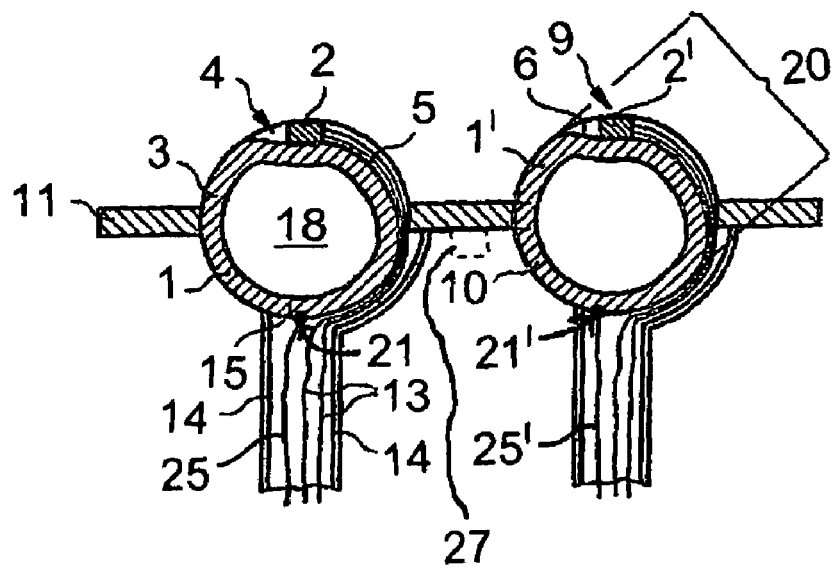
FIG. 2 is a cross-sectional view of the measuring device of the invention according to FIG. 1.

FIG. 2 is a cross-section of a measuring device according to the invention, showing the thermocouple 2, 2' disposed eccentrically or off-center in a portion 20 that is deformed by the indentation 4. A pipe wall 3 is deformed by the indentation 4 in such a way that an inner chamber 18 exhibits a corresponding deformation. A reduction in the sectional area of the inner chamber 8 is about 20% as compared to a sectional area of an un-deformed pressure pipe 1. The electrical lines 13 of the thermocouple 2, 2' extend in the indentation 4 inside a filling material 6, as a result of which the lines are protected from mechanical, thermal and chemical influences. The electrical lines 13 are particularly protected on the side facing the stream of heating fluid 8, i.e. at the circumferential portion. The electrical lines 13 normally extend in the filling material 6 beyond the wall 11 connecting the two pressure pipes 1, 1'. Behind the connecting wall 11, the electrical lines 13 are guided in a protective pipe 14, which also protects the electrical lines. The protective pipe 14 is disposed at a side 15 of the pressure pipe 1 substantially opposite to the thermocouples 2, 2'. The pressure pipes 1, 1' are electrically contacted by the electrical terminals 21, 21' which are electrically connected to the control device 16 through the connecting lines 25, thus allowing measurement of the electrical resistance along and/or transversely to the pressure pipes 1, 1'. Information regarding the state of the heat exchanger 24, in particular the pressure pipes thereof, for example information regarding its degree of corrosion, is obtained through the use of the electrical resistance.

Figure 3:
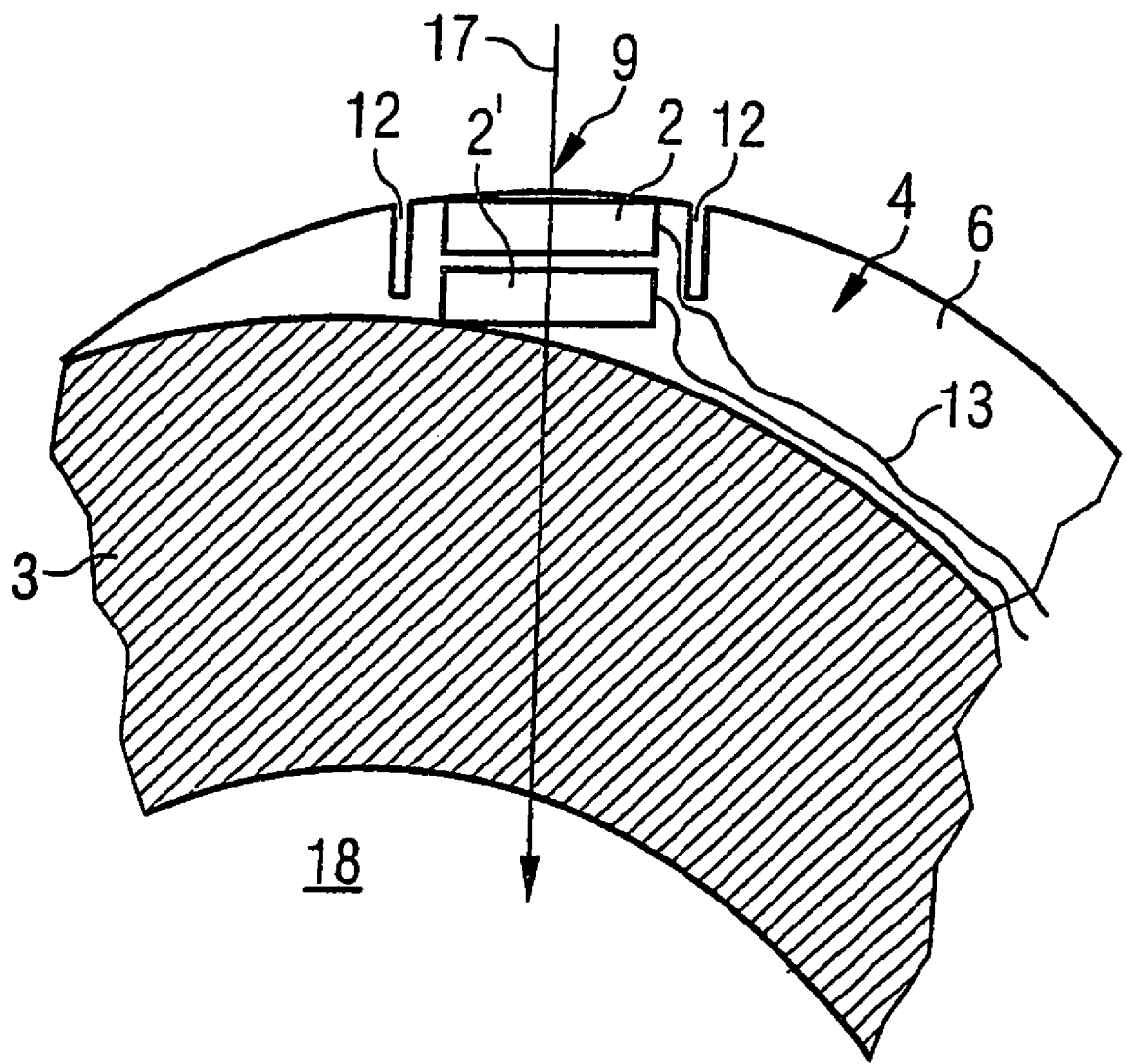
FIG. 3 is an enlarged cross-sectional view of a portion of the measuring device of the invention according to FIG. 2.

FIG. 3 is an enlarged cross-section of a measuring device of the invention according to FIG. 2. The figure shows the two thermocouples 2, 2', which are disposed one above the other in the indentation 4 and are surrounded by an annular groove 12. The annular groove 12 represents a heat conduction barrier which eliminates heat flux gradients obliquely to a heat flow 17 to be measured, thus improving the accuracy of the measuring device. The electrical lines 13 are guided in the filling material 6, which fills the indentation 4 without protruding. As a result of the spatial separation of the two thermocouples 2, 2', the heat flow 17 is determined using the coefficients of thermal conduction.

The invention relates to a measuring device 26 for a heat exchanger 24 having a pressure pipe 1 and at least one thermocouple 2, 2'. The pressure pipe 1 has a pipe wall 3, in which there is an indentation 4, that extends over a portion 20 of the circumference of the pipe wall 3. The indentation 4 receives the thermocouple 2, 2', is filled with filling material 6, and is distinguished by allowing the thermocouple 2, 2' to be disposed eccentrically in the portion 20 that is deformed by the indentation 4. The invention also relates to a method for producing measuring devices of this type.

The invention is furthermore distinguished in that the eccentric configuration of the thermocouple 2, 2' allows the size of the indentation 4 to be reduced while the size of the thermocouple 2, 2' is kept constant. As a result thereof, the heat flux through the pipe wall 3 is impeded to a comparatively small degree and local overheating of the pipe wall 3 is prevented.

We claim:

1. A measuring device for a heat exchanger, the measuring device comprising:
   a heat exchanger pressure pipe having a pipe wall with a circumference and an inner chamber, and an asymmetric indentation extending over and deforming a portion of said circumference so that an internal cross-section of said inner chamber in a deformed section of said pressure pipe is reduced as compared to an internal cross-section of said inner chamber in an un-deformed section of said pressure pipe;
   at least one thermocouple with its electrical lines provided in said indentation, said at least one thermocouple being disposed eccentrically in said asymmetric indentation; and
   filling material filling said indentation so that both said thermocouple and said electrical lines are embedded in said filling material.

2. The measuring device according to claim 1, wherein said at least one thermocouple includes two thermocouples for measuring a heat flux, said two thermocouples being disposed eccentrically and spatially separated in said indentation.

3. The measuring device according to claim 1, wherein said indentation has a center, said pressure pipe has a circumferential portion acted on by a stream of heating fluid, and said circumferential portion has a center spatially separated from said center of said indentation.

4. The measuring device according to claim 1, wherein said at least one thermocouple includes two thermocouples disposed substantially above one another in said indentation in said pressure pipe, for measuring a heat flux through said pipe wall.

5. The measuring device according to claim 1, wherein said pressure pipe has a side wall portion, and a connecting wall connects said side wall portion to an adjacent pressure pipe.

6. The measuring device according to claim 1, wherein said at least one thermocouple includes two thermocouples, and at least one heat conduction barrier surrounds said thermocouples.

7. The measuring device according to claim 6, wherein said heat conduction barrier is formed by an annular groove around said thermocouples.

8. The measuring device according to claim 1, which further comprises electrical lines connected to said thermocouple, said pressure pipe having a side disposed substantially opposite to said thermocouple, and a protective pipe for said electrical lines being attached to said pressure pipe at said side substantially opposite to said thermocouple.

9. The measuring device according to claim 1, wherein said filling material fills said indentation without protruding.

10. The measuring device according to claim 1, wherein said filling material is welding material.

11. The measuring device according to claim 1, which further comprises an electrical terminal disposed on said pressure pipe.

12. The measuring device according to claim 5, which further comprises an electrical terminal disposed on said connecting wall.

13. A method for producing a measuring device in a pressure pipe of a heat exchanger, which comprises the following steps:
   providing an asymmetric indentation extending over and deforming a portion of a circumference of a pipe wall of the pressure pipe so that an internal cross-section of an inner chamber of the pressure pipe in a deformed section is reduced as compared to an internal cross-section of the inner chamber of the pressure pipe in an undeformed section;

placing at least one thermocouple with its electrical lines in the indentation, the at least one thermocouple being disposed eccentrically in the asymmetric indentation; and substantially filling the indentation with filling material so that both the thermocouple and the electrical lines are embedded in the filling material.

14. The method according to claim 13, which further comprises placing at least two thermocouples eccentrically and spatially separated in the indentation.

15. The method according to claim 13, which further comprises carrying out the filling step by filling the indentation with the filling material without protrusion.

16. The method according to claim 13, which further comprises placing an electrical terminal at least at one of the pressure pipe or a connecting wall connecting the pressure pipe to an adjacent pressure pipe.

17. A heat exchanger, comprising:

a measuring device including:

a heat exchanger pressure pipe having a pipe wall with a circumference and an inner chamber, and an asymmetric indentation extending over and deforming a portion of said circumference so that an internal cross-section of said inner chamber in a deformed section of said pressure pipe is reduced as compared to an internal cross-section of said inner chamber in an undeformed section of said pressure pipe;

at least one thermocouple with its electrical lines provided in said indentation, said at least one thermocouple being disposed eccentrically in said asymmetric indentation; and filling material filling said indentation so that both said thermocouple and said electrical lines are embedded in said filling material.

* * * * *